(12) United States Patent
Hermann et al.

(10) Patent No.: US 8,768,498 B2
(45) Date of Patent: Jul. 1, 2014

(54) METHOD FOR OPERATING AN INDUSTRIAL SYSTEM

(75) Inventors: Thomas Hermann, Iserlohn (DE);
Wolfgang Buchkremer, Grevenbroich (DE)

(73) Assignee: KHS GmbH, Dortmund (DE)

( * ) Notice: Subject to any disclaimer, the term of this patent is extended or adjusted under 35 U.S.C. 154(b) by 634 days.

(21) Appl. No.: 13/058,440

(22) PCT Filed: Aug. 4, 2009

(86) PCT No.: PCT/EP2009/005613
§ 371 (c)(1),
(2), (4) Date: Feb. 10, 2011

(87) PCT Pub. No.: WO2010/031463
PCT Pub. Date: Mar. 25, 2010

(65) Prior Publication Data
US 2011/0137447 A1    Jun. 9, 2011

(30) Foreign Application Priority Data

Sep. 17, 2008   (DE) .......................... 10 2008 048 552

(51) Int. Cl.
*G06F 19/00*   (2011.01)

(52) U.S. Cl.
USPC ............................... 700/99; 700/106; 29/430

(58) Field of Classification Search
CPC .................. G05B 19/14185; G05B 19/41865; G05B 22/9131; Y10S 707/99948; G06K 9/00; B25J 9/1687
USPC ............. 700/99, 95, 106, 107, 112, 116, 108, 700/83, 174; 29/430, 720; 707/999.07
See application file for complete search history.

(56) References Cited

U.S. PATENT DOCUMENTS

| | | | | |
|---|---|---|---|---|
| 4,120,629 A | * | 10/1978 | Christian et al. | 198/341.02 |
| 4,758,888 A | * | 7/1988 | Lapidot | 348/91 |
| 5,202,836 A | * | 4/1993 | Iida et al. | 700/101 |
| 5,255,197 A | * | 10/1993 | Iida | 700/108 |
| 5,402,349 A | * | 3/1995 | Fujita et al. | 700/97 |
| 5,410,469 A | * | 4/1995 | Sakamoto et al. | 700/9 |
| 5,555,504 A | * | 9/1996 | Lepper et al. | 700/115 |
| 6,378,200 B1 | * | 4/2002 | Lim et al. | 29/832 |
| 6,418,351 B1 | * | 7/2002 | Martin | 700/108 |

(Continued)

FOREIGN PATENT DOCUMENTS

| | | |
|---|---|---|
| DE | 10129567 | 8/2002 |
| RU | 2311676 | 11/2007 |

(Continued)

*Primary Examiner* — Kidest Bahta
(74) *Attorney, Agent, or Firm* — Occhiuti & Rohlicek LLP

(57) ABSTRACT

The present invention relates to a method for operating an industrial system, wherein the system comprises at least one line (1, 2, 3, 4), wherein each line (1, 2, 3, 4) comprises at least one machine (10, 12, 14, 16), and wherein each machine (10, 12, 14, 16) comprises at least one component (110, 112, 114, 116), comprising the steps of detecting state data of each component (110, 112, 114, 116), of each machine (10, 12, 14, 16), and of each line (1, 2, 3, 4), transmitting the state data to at least one user unit, and displaying the state data by means of the at least one user unit. The present invention further relates to an industrial system for performing the method, and a computer program.

16 Claims, 5 Drawing Sheets

(56) References Cited

U.S. PATENT DOCUMENTS

| | | | |
|---|---|---|---|
| 6,665,586 B1 * | 12/2003 | Ball et al. | 700/226 |
| 6,801,822 B1 * | 10/2004 | Fujiwara et al. | 700/108 |
| 8,484,250 B2 * | 7/2013 | Chand et al. | 707/794 |
| 2003/0033037 A1 * | 2/2003 | Yuen et al. | 700/86 |
| 2005/0149216 A1 | 7/2005 | Popplewell | |
| 2007/0078862 A1 * | 4/2007 | Chand et al. | 707/100 |
| 2007/0132774 A1 * | 6/2007 | Fan et al. | 345/564 |
| 2008/0066004 A1 * | 3/2008 | Blevins et al. | 715/771 |
| 2008/0079898 A1 * | 4/2008 | Miwa et al. | 351/205 |

FOREIGN PATENT DOCUMENTS

| | | |
|---|---|---|
| RU | 2323472 | 4/2008 |
| WO | WO 03/102817 | 12/2003 |
| WO | 2005/109122 | 11/2005 |
| WO | 2006/080366 | 8/2006 |

* cited by examiner

METHOD FOR OPERATING AN INDUSTRIAL SYSTEM

CROSS-REFERENCE TO RELATED APPLICATIONS

This application is the National Stage of International Application No. PCT/EP2009/005613, filed on Aug. 4, 2009, which claims the priority of German Patent Application No. 10 2008 048 552.7, filed on Sep. 17, 2008. The contents of both applications are hereby incorporated by reference in their entirety.

TECHNICAL FIELD

This invention relates to a process for the operation of an industrial system, an industrial system for performing the process as per the invention and a computer program that has a program coding facility to perform all of the stages of the process as per the invention.

DESCRIPTION OF THE STATE-OF-THE ART

Industrial systems within the meaning of the invention basically include all conceivable fields of mechanical and plant engineering. These include in particular manufacturing and production plants and plants for production of special purpose machines such as packaging or bottling plants, in particular those for filling bottles with beverages.

A study will be made in the text that follows just of bottling plants as an industrial system by way of an example; however in addition, this invention can be utilized in all other types of industrial systems.

Industrial systems are arranged in so-called lines, whereby each line produces a specific end product, for example, a specific size of bottle that is filled with a specific drink.

Several lines that are operated in parallel to each other can be installed within an industrial system.

As a rule, each line actually includes several machines with a specific individual operation being performed on each machine as part of the production process of the end product. These production stages can for example involve processes for the grouping, washing, transporting, filling, sealing or labeling of bottles Each machine as a rule has several interacting components to perform the respective production operations of the machine.

Different possibilities are known about in the state-of-the-art for the monitoring and controlling of the manufacture of the end products. There are control devices installed on each machine by means of which the operating conditions of the machine in question can be monitored and controlled.

As a rule, therefore, one operator is required for each machine to monitor its operation and make the necessary inputs.

Having the ability to recognize and classify errors that may occur as rapidly as possible is an essential element of the monitoring or operation of a machine. A stoppage on just one single machine can result in the whole line no longer being able to operate as the functionality of the whole line is dependent upon all of the machines in the line working.

This can also lead to a machine being damaged in the event of critical errors.

It is therefore desirable to be able to recognize, classify and correct errors that occur on a machine as rapidly as possible.

In the state-of-the-art, as a rule a warning device—for example a rotating flashing light that gives warnings in the event of an error—is fitted on every machine. Someone that is on or near the machine in question then has to hurry to the machine to classify the error and make a decision on what to do next.

But the drawback that then arises is that large numbers of operators are required to provide an effective monitoring and control of one or indeed several lines. Because of the frequently considerable distances that have to be covered within a industrial system, a lot of time may elapse before the classification of an error can be initiated. Furthermore as a rule the operators of different machines have differing qualifications so that it may happen that an operator has to classify an error which is not in line with his/her particular specialized know-how.

Furthermore no coordination is in place as to which operator has to deal with any particular error that may occur. As a rule, all operating staff tend to make their way to the machine in question when they become aware of a warning notice, so that an oversupply situation always arises.

Even if only one operator makes his/her way to the faulty machine in question and can classify the error/fault, the appropriate capabilities and the right tool are often not available to rectify the fault. In addition, the operator frequently does not have the requisite authority to be able, above all else, to take a decision on the further action, so that a checking process has to be undertaken with those in more senior positions before, for instance, the production of a line can be stopped.

There are also often misunderstandings between the operator and his/her superiors, as not all of those involved have access to information of the same quality. Thus, a process for operating an industrial system is required that enables the system to be more efficient.

SUMMARY OF THE INVENTION

In contrast to that, in this invention provision is made for the operation of an industrial system as per Claim 1, for an industrial system as per Claim 12 and for a computer program as per Claim 14.

The process for the operation of an industrial system, whereby the system includes at least one line, whereby each line includes at least one machine and whereby each machine includes at least one component, offers the means for the detection of the status data of each component, of each machine and of each line and of the transmission of the status data to at least one user unit and the presentation of the status data by at least one user unit.

Whilst up until now, the status data of a machine is simply detected on a machine-by-machine basis and is displayed on one user unit allocated to the corresponding machine, the process as per the invention enables the status data of the whole line or of several lines throughout the system to be detected and to be transmitted to one or preferably several or even all of the user units. Access to the status data of all lines, machines and components regardless of location is thereby enabled, which forms the basis for rapid monitoring and decision-making by operating staff.

Basically, the provision of comprehensive status data on lines, machines and components is made possible.

In order to simplify the navigation within this abundance of status information, provision is made for the arranging of the status data into a hierarchic structure, whereby the status data of each of the components is assigned to the corresponding machine, which includes every component and with the status data of every line also being coordinated with the status data of any additional lines.

Alternatively provision can obviously also be made to assign the status data of each line to the whole system, of which these lines are a part.

In this way overall the navigation is performed within the hierarchic structure on three levels. Thus Level 1 forms the lines level, Level 2 forms the machines level that is subordinate to the lines level and Level 3 forms the components level that is subordinate to the machines level.

With this it is firstly possible to provide a navigation according to the logical structure of the hierarchic structure 3, i.e. all of the machines of a line are displayed to the user at the subordinate machines level of a line when a line is selected and when a subsequent selection is made of a particular machine then all of the components of the selected machine are displayed to the user at the components level. Provision can be made in addition for the user to be able to navigate within a level, i.e. to move "horizontally" within the hierarchic structure in order to further simplify the navigation.

Thus it can be possible that when a user has selected a particular status parameter of a machine, he/she can jump horizontally to the next machine in the line and the corresponding status parameter will be displayed, without he/she having to navigate via the higher level line structure.

Furthermore, it is possible to assign and thus group the status data of particular subject areas. Thus precise status data is generated, which is displayed to the user, depending on the subject area and the level of the hierarchic structure at which the user is within the presentation.

By way of an example, a summary covering the machines in the line together with a possibility of selecting one machine and thus gaining access to the machines level can be made available in a "Summary" subject area on the lines level.

Accordingly, a summary on the components of the machine in question together with the possibility of selecting a specific component and thereby having access to the components level can be made available at the machines level.

Furthermore a "Program" subject area can be made available. Accordingly, it is possible to see an automated sequence of work stages of a machine or of a component.

It is possible to arrange things so that in one embodiment of the invention the process shows the further stage of the reception of the input data for a particular component, a particular machine or a particular line of each user unit and the stage of the transmission of the input data to the respective component, the respective machine or the respective line.

Not only is there a possibility of monitoring the whole line or all of the lines of each user unit provided, but also the possibility arises of controlling each user unit from each line, machine or component.

In this way, for example, a program selection and a visualizing of the stages can be displayed under the "Program" subject area. A user can then perform functions via the program selection such as an empty run, a test run, removing bottles for laboratory tests, purging, cleaning, moving the servo-axes or resetting the machine into its basic setting. A program selection of the component-related functions such as a purging or cleaning of the components is provided to the user at the component level.

Furthermore, it can be arranged that the user receives a display with basic parameters on the lines level under a "Parameters" subject area, such as perhaps the speed of the belt conveyor. It can also be arranged on the machines level that machine parameters such as perhaps the speed are displayed. Furthermore, it can be arranged at the machines level that a user can directly influence the performance of a machine, perhaps by adjusting the speed stagers, which can already be pre-programmed. It can also be arranged on the components level that the variable parameters and/or set values of a corresponding component can be displayed or influenced.

It can be arranged at the machines level that a "Flow-chart" of the corresponding machine can be displayed under a subject area and that a section of the machine's flow chart/diagram that relates to the corresponding components can be displayed at the components level.

It can be arranged at the machines level and at the components level that a summary of all of machine's analogue values or documents is displayed under an "Analogue values" subject area.

Furthermore it can be arranged that information affecting the corresponding line is displayed at the lines level under an "Information" subject area. It can furthermore be arranged that information affecting the corresponding machines or components is displayed at the machines level.

It can be arranged under the subject area of "Sort" for a view of the end product that is currently being produced, or in the case of a bottling plant line, a view of the currently bottled end product to be displayed to a user at the lines level.

Furthermore it can be arranged that the user at the lines level can set the desired kind of bottling process, i.e. a sort-management can be made available.

It can be arranged that a recently completed type of bottling can be displayed at the machines level and the type of bottling to be performed can be changed or adjusted. It can furthermore be arranged that a sorts-editor is selected, in which new sorts can be created for selection at the machines level or at the lines level. It can be also arranged so that there is the possibility of a function for downloading of sorts from a further processing unit.

It can be arranged so that a user has to register or to log-in to make use of a user unit. A specific profile is held on file for each user, which contains the user's different data. The user's qualifications, his/her position in the company and his/her levels of authorisation can be held in this data, which establish the extent to which user can influence the lines, machines and components.

It can therefore be arranged that the presentation of the status data is made depending on the user's profile, which means an automated selection or restriction of the status data that is displayed being performed. Furthermore, the type of input data can be restricted according to the profile, which means that the user can only carry out certain inputs in line with his/her specific authorisation and position.

It can therefore be specified that an overview of all of the appropriate lines is displayed to assigned persons under a "Persons" subject area at the lines level. It can therefore be arranged that all of the persons or users are displayed at the machines level that have logged-on to a user unit of the machine or are assigned to do so through other allocations of the machine.

An overview can be given on ongoing possible maintenance procedures or a historical record of the maintenance activities already undertaken can be called-up in a "Maintenance/Service" subject area. A maintenance history can also be accessed or also preset maintenance intervals, general technical specifications or similar items at the machines level. Provision can also be made to enable data inputs to be made from the start-up of a routine maintenance process of the machine in question.

Provision can further be made so that the user units can communicate with each other. Obviously provision can also be made so that contact to external positions or companies can be made either via the Internet or via conventional telephone connections through a user unit.

Thus provision can be made for directly contacting a specific service team or a particular external company and instructing them on the servicing of the machine in question at the machines level under "Maintenance/Service".

Provision can also be made at the components level under "Maintenance/Service" to access technical specifications or data of a corresponding unit as well as the maintenance history and specified maintenance intervals. In addition, information and details for placing orders for spare parts for the components in question can be displayed.

Apart from that an overview of the current errors or a history of error messages from previous years can be accessed under the "Errors" subject area. A history of error messages can also be accessed at the machines level. Furthermore arrangements can be made to access a basic drawing of the machine in question. Obviously it can also be arranged to display the causes of errors for the machine in question and for the possibility to be given to instruct other users on the rectification of the errors. It can then be arranged in this respect that they can acknowledge receipt of the fault-correcting order via their user unit at the machine level.

As already mentioned above, it can be arranged that some of these displaying or inputting possibilities, especially those advising other users on the fault rectification are only made available to users with an appropriate profile—for example users that have an appropriate position within the hierarchy of the company that operates the overall system.

It can also be arranged at the components level in the "Error" subject area that the cause of the fault is displayed. It can be arranged if necessary that a photo, an illustration or a sketch of the faulty components is displayed. It can be of course arranged for a history of the error messages to be shown and it can also be made possible for instructions on the fault rectification to be given or acknowledged.

It can furthermore be arranged that specific error messages are only displayed to those users that have a specific profile. Thus a restriction can automatically be made to the effect that error messages are only sent to those users for whom the error messages are of interest or are relevant. The display of error messages is to be developed in such a way that error messages are presented basically independently from the ongoing restriction of the displays. Thus, error messages can also be displayed, even if at that time another machine or another line or a component that is not part of the faulty machine is being displayed via the user unit.

As it may possibly happen that several users make an input for the same machine, line or component, it can be arranged in order to react to an error message, that depending on the profile, only the input data of one single user is transmitted. Thus, for example, a value for the priority of his/her input data can be filed in the profile of each user and in the event of a conflict only the input data of the user with the highest priority level will then be transmitted.

In addition it can be basically specified that the restriction of the displaying of the status data and also of the input data is made depending on the spatial position of the respective user unit in relation to at least one line, to at least one machine and/or to at least one component.

In this way, the navigation can be performed in an automated way within the hierarchic structure. The user units can be specified as being static, although mobile terminals are also provided. A wireless network within an industrial system as per the invention can be arranged for the mobile user units or terminals, via which the status data or the input data are transmitted. A wireless local area network (WLAN network) or even a Bluetooth network or any other suitable type of data transmission system can be selected for the wireless network.

The spatial arrangement of the at least one line, of the at least one machine and of the at least one component can be stored via fixed values or be defined by means of a suitable transmitter or several transmitters within the wireless network. Basically a GPS positioning method is also conceivable.

A positioning of the mobile user units is made in a similar manner. Using the respective position data, it is then possible to compare the spatial position of the lines, machines and components with the position of the mobile user unit. This comparison can if necessary be made on a further external computer.

In this way it can be arranged that the particular line, machine or component that is spatially closest to the user unit is always displayed on that user unit. In this way a user on a maintenance round having to constantly change the display manually can be avoided.

It can basically be arranged that the user unit has a facility for the external display. For example, it can be arranged that for a video-beamer to be built into a mobile user unit, via which the current display can be projected onto a wall or another flat surface. In this way, several people should easily be able to examine the display on the mobile user unit.

In addition it can be arranged that navigation by means of speech dial-up can be performed not only on a static user unit but also on a mobile user unit.

Apart from that, it can be arranged, for instance, that photos of a damaged machine or component can be taken and transmitted via a mobile user unit.

It can furthermore be arranged for the mobile user unit to have a barcode scanner or in general a scanner for a two-dimensional code. Corresponding single or two-dimensional codes can be installed on the lines, machines and components so that the navigation is performed within the display by scanning the codes via the mobile user unit. Furthermore RFID-based markings via an appropriate/suitable reading/writing system can be utilized.

Finally, it can be arranged that screenshots of the display are produced not only by the static but also by the mobile unit as well.

The invention also relates to a computer program with a program-coding facility in order to perform all of the stages of the process that has been described, when the computer program is executed on a computer or an appropriate processing unit, in particular in an industrial system as per the invention.

The computer program can be stored on a computer-readable data carrier.

This description also covers a computer-programming product with a program-coding facility, which is stored on a computer-readable data carrier and which is developed for executing all of the stages of a described process, when the computer program is executed on a computer or on an appropriate processing unit, in particular in a control unit as per the invention.

Further advantages and arrangements of the invention arise from the description and from the attached drawing.

It should be understood that the aforementioned stated characteristics and those subsequent ones that are still to be presented are not only able to be utilized in the particular combination that has been described, but also in other combinations or in isolation, without leaving the framework of this invention.

The invention is schematically presented using an illustrated embodiment in the drawing and is described hereinafter in detail making reference to the drawing.

DETAILED DESCRIPTION

Figure 1:
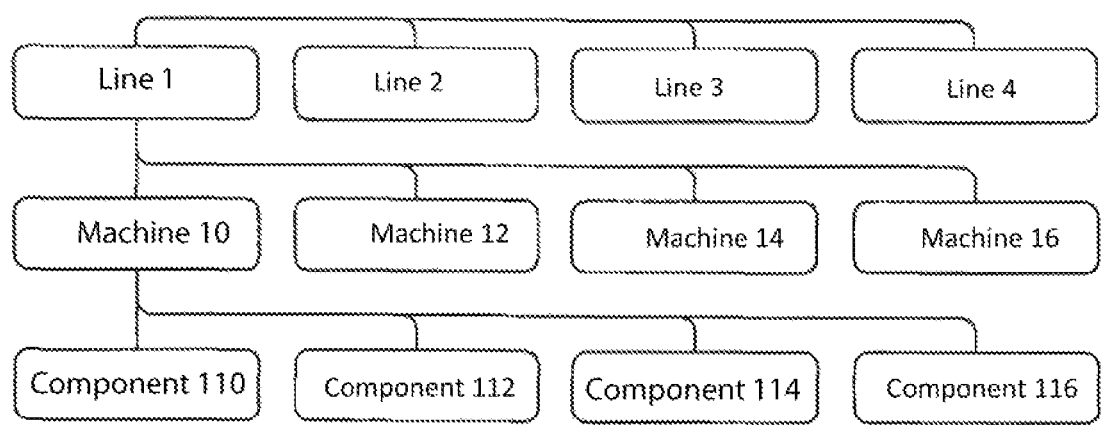
FIG. 1 shows an abstracted representation of an industrial system.

FIG. 1 shows in abstracted form the links within a representation of an industrial system. The industrial system has four lines 1, 2, 3, 4 in the embodiment presented in FIG. 1. Line 1 in its turn includes four machines 10, 12, 14, 16. This can be in relation to a line for the filling of bottles with beverages, whereby each machine executes am appropriate work-stage within the line, maybe the washing and arranging of the bottles, the filling, the sealing of the bottles and the labelling of the bottles.

The machine in its turn includes four components 110, 112, 114, 116.

Obviously the lines 2, 3 & 4 and the machines 12, 14, 16 also include several machines or components, but these are not shown for overviewing reasons.

The presentation of the status data is arranged in a hierarchic structure. In addition, as per the invention, not only the status data for one machine is shown, but also in fact the status data of all of the machines of all of the lines. In this way it is possible to switch between the respective lines 1, 2, 3, 4 as well as to navigate within the lines 1, 2, 3, 4. All of the data of the industrial system can be accessed in this way on one user unit.

Figure 2:
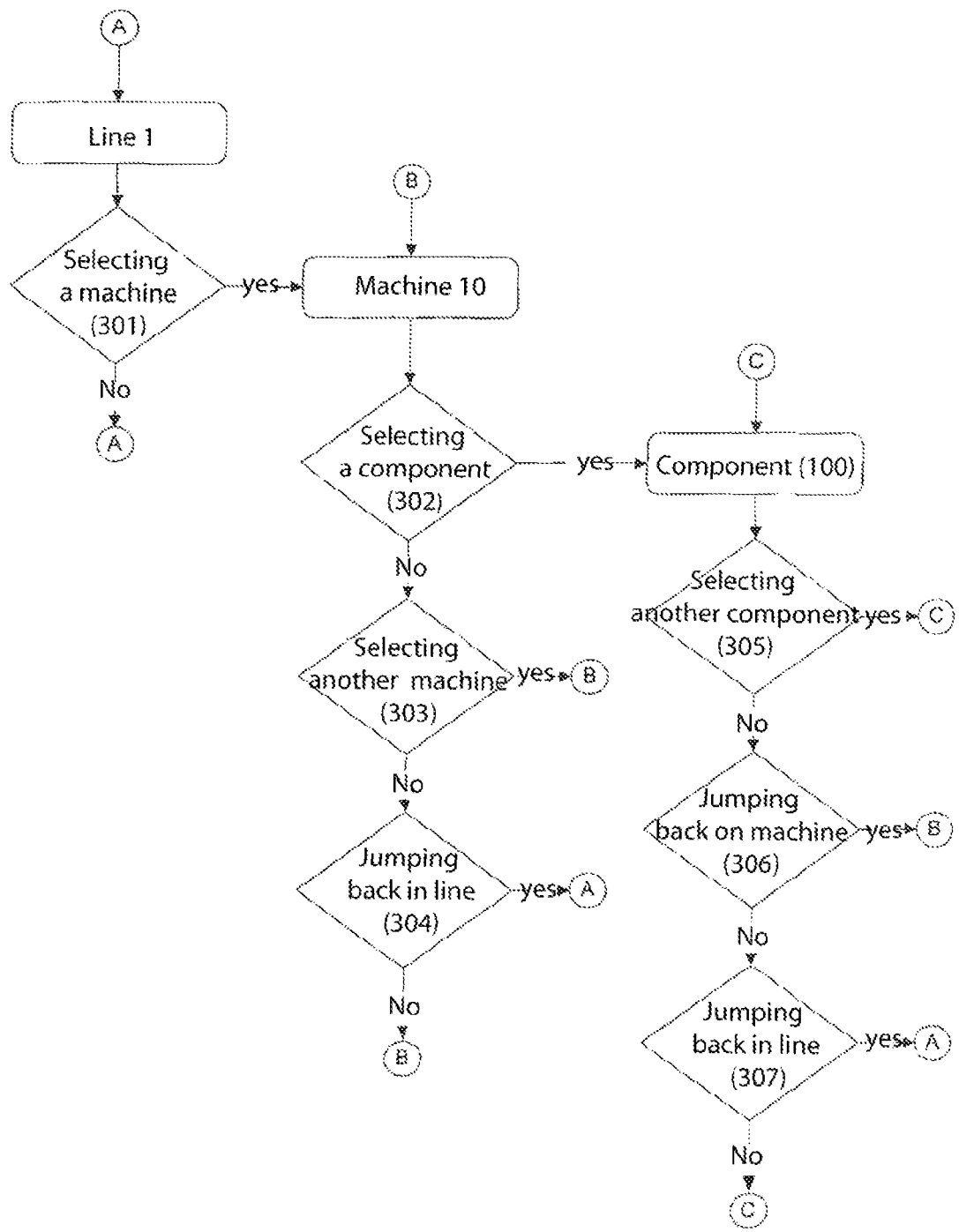
FIG. 2 shows a flow-chart, which illustrates the navigation within the representation of the industrial system in FIG. 1.

FIG. 2 shows a flow-chart, which illustrates a possible navigation within the presentation.

Commencing from the starting point A, a line 1 is first of all selected. Basically it is of course possible to also select one of the other lines 2,3,& 4 and to jump within a lines level between the different lines.

The possibility exists within line 1 to select a specific machine of line 1 in a Step 301. If no selection is made the presentation remains unchanged and if a selection is made, e.g. that of machine 10, the presentation will then be restricted to machine 10.

The possibility now arises of selecting a component of machine 10 in a Step 302. If no selection is made, another machine can be selected in a Step 303. It is also possible in this way to move horizontally within the machines level without performing the navigation via the roundabout way of the higher-ranking lines level. If another machine is selected, the information retrieval starts again from Point B.

Should no other machine be selected, the possibility exists to jump back in one Step 304 to the higher-ranking lines level, whereupon the information retrieval commences once more from Point A.

If no selection is made, the presentation remains unchanged. The information retrieval commences once more from Point B.

If a component, which is subordinate to the machine 10 is selected in Step 302, the presentation jumps to the components-level.

Basically another component can be selected here in a Step 305, so that a horizontal move at the components level is also possible without having to take a roundabout way via the machines level and the lines level.

If no selection is made in the Step 305, a return can be made in a Step 306 back to the machines level. If this selection is made, the information retrieval will be continued to Point B for the respective machine, which includes the component 110.

Should no selection be made in Step 306, a return can be made in Step 306 directly to the lines level back in line 1, which includes the machine 10, which in turn includes the component 110. The information retrieval then continues to Point A.

If this selection is also not made, the information retrieval will continue to Point C and the presentation/display remains unchanged.

Figure 3:
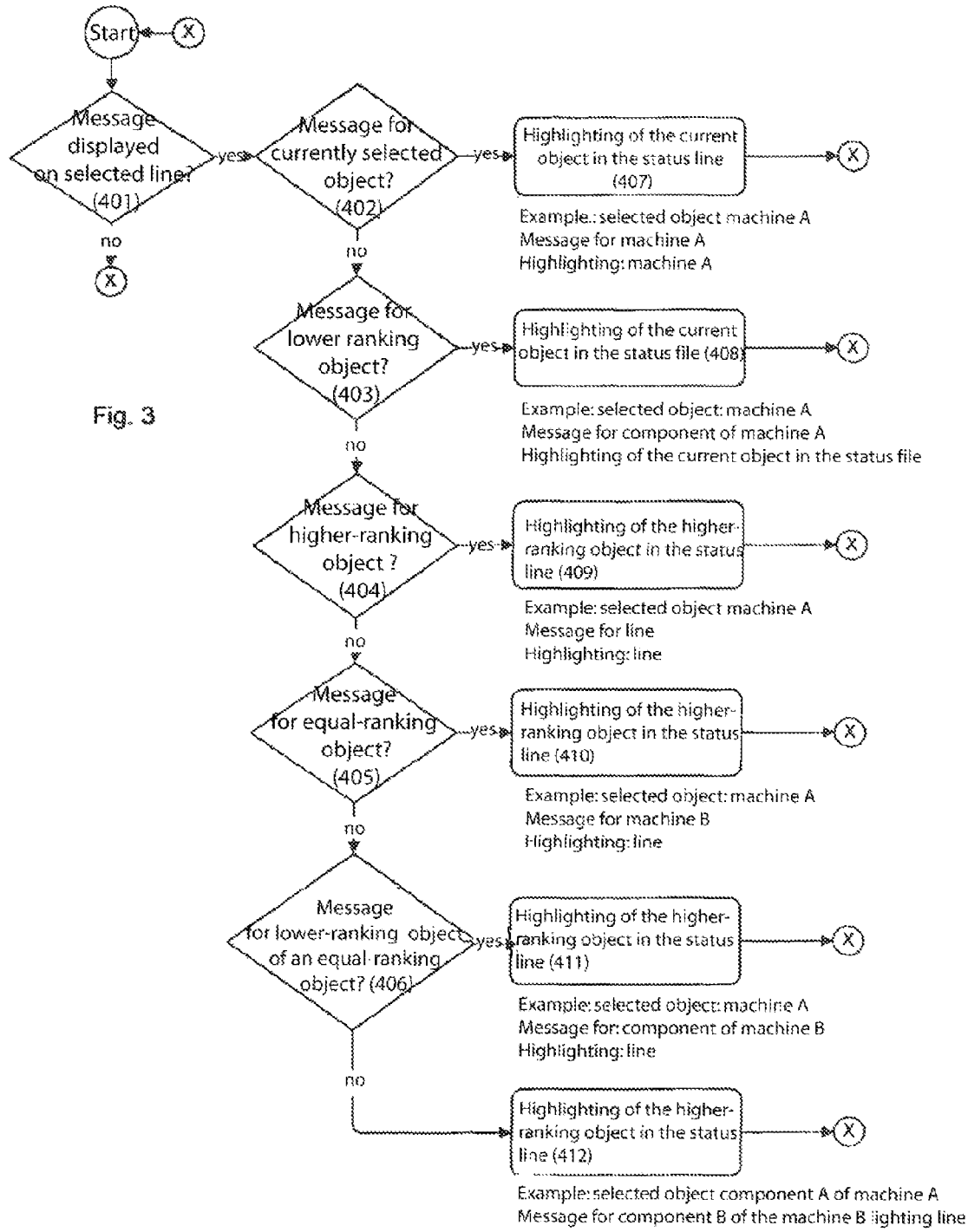
FIG. 3 shows a flow-chart, which illustrates the representation of an error message.

FIG. 3 shows a flow-chart, which illustrates a preferred way to deal with error messages within the presentation.

If an error message is prompted at Point X into the user unit, it will firstly be determined whether the error message concerns the line that is currently selected for display. If the selected line is not affected, then no action is taken and the information retrieval is restarted.

Obviously it can moreover also be arranged in a modified embodiment that instead of just ignoring the error message, a highlighting is made in the display that another line is the subject of an error message.

Should the selected line be affected, it will be determined in Steps 402, 403, 404, 405 & 406, whether the message relates to a currently selected item, i.e. the currently selected machine or component or to a subordinate, higher-ranking, similar-ranking or to a subordinate object of a similar-ranking object.

A status line is therefore arranged in the presentation, which clarifies the current position of the display in the hierarchic structure. With this, the currently selected line is displayed in the status line by an means of an icon, the currently selected machine by a further icon and the currently selected component by a third icon. Accordingly there is a lines icon that is shown at the lines level. If a specific machine is selected, an icon for the selected machine will be displayed next to the corresponding lines icon. If a further component is selected, a third icon is added, which represents the selected component.

A navigation within the display is possible via this icon. For example, a move back into the lines level can be made by selecting the corresponding line icon. It can also, for example, be arranged to equip the user unit with a touchscreen, which enables easy selection of the icon.

After it has been determined in the Steps 402, 403, 404, 405 and 406 which object—i.e. which machine or component—is affected by the error message, one of the corresponding Steps 407, 408, 409, 410 & 412 is then followed in the signal words of an icon in the status line. When one of the corresponding aforementioned icons is selected, the corresponding signal words are amended. In this way a user can only follow the signal words with his/her selection in order to get to the object—i.e. machine or component—that is affected by an error message within the hierarchic structure.

The user does not need to orientate him/herself within the hierarchic structure as this is enabled by a secure navigation particularly in stressful situations.

Figure 4:
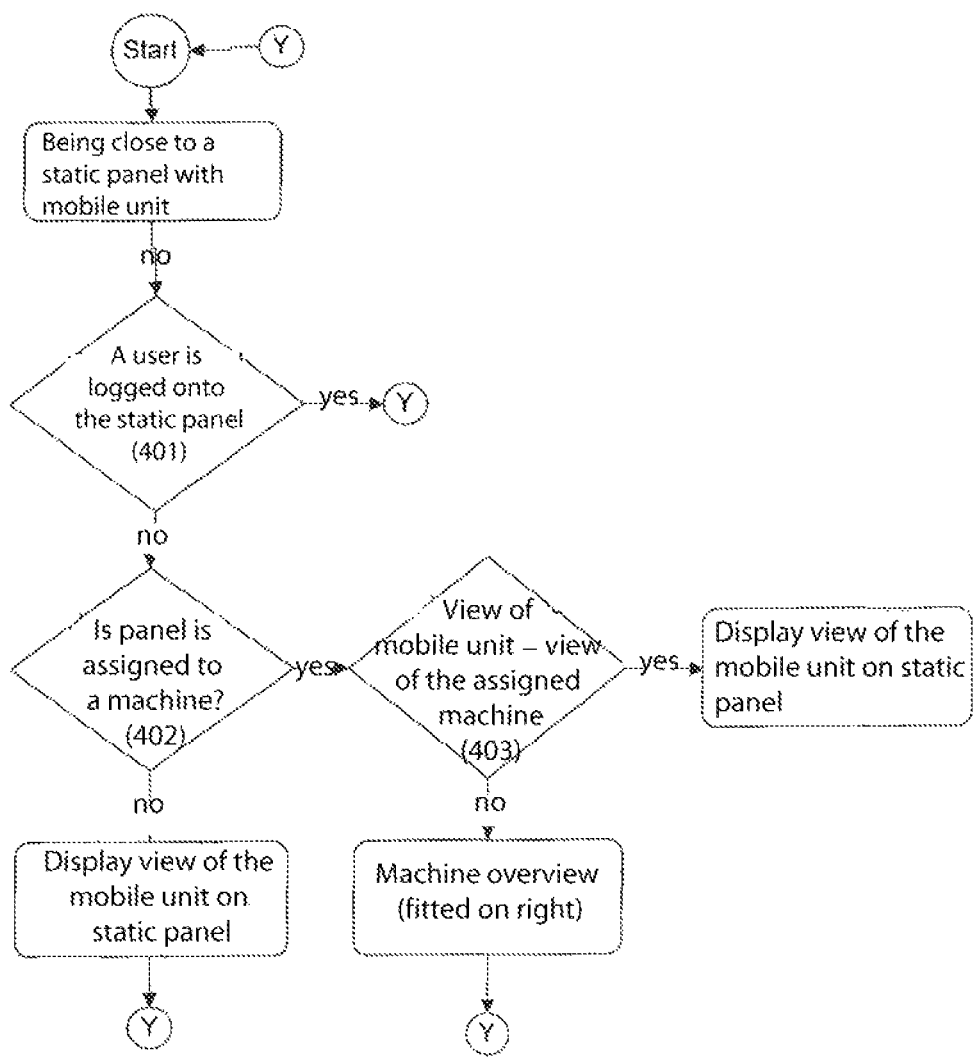
FIG. 4 shows a flow-chart, which can be executed, when a mobile user unit is close to a static user unit.

FIG. 4 shows a glow-chart, which presents a possible resolution for a conflict situation, in which a user with a mobile user unit is close to a machine, which has in addition a static operating unit.

In this the term "panel" is used to describe a static operating unit.

If a user of a mobile user unit is close to a machine, it can be ascertained in a Step 401 as to whether a user is already utilizing the panel for monitoring and controlling the corresponding machine. If this should be the case, it is arranged that no take-over of the panel and of the control function of the machine is made.

Obviously, alternative arrangements can be made so that the user profiles are aligned and so that the control over the panel and the machine is transferred to the user who has been given a higher ranking in his/her user profile.

Should no user be logged-in on the panel, it can be checked in Step 402 as to whether the panel is permanently assigned to a particular machine. Should this not be the case, the current display of the mobile user unit is shown on the panel. The user can use the panel, which as a rule has larger and more convenient display and operating elements.

If the panel should be dedicated to a particular machine, a check will be in a Step 403 as to whether the currently selected machine on the mobile user unit corresponds to the dedicated machine. If this is the case, the current display of the mobile user unit will be shown on the panel and the user can utilize the panel with its more convenient operating elements for further operations. Should this not be the case, a summary about the machine will be displayed on the panel, which is automatically adapted to the profile of the user, so that the user can only access the particular status data that are assigned to him/her via his/her profile.

An automated transfer of operation of static user units is thus achieved in a convenient way, when a user with a mobile user unit is moving around within the industrial system and is close to a static user unit.

Figure 5:
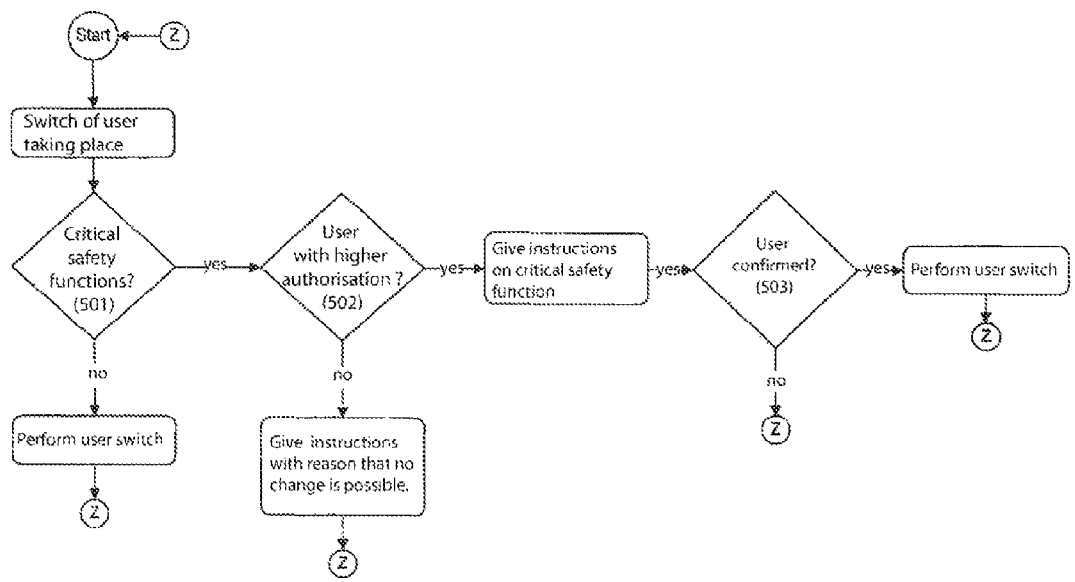
FIG. 5 shows a flow-chart, which illustrates the assumption of control over a line, machine or component.

FIG. 5 shows a flow-chart that illustrates a possibility of how things can be handled in a conflict situation, in which two users wish to access the same object—i.e. a component or a machine.

It is first of all established that several users wish to access the same machine or component. In this there is the situation where a first user having a first user profile is already accessing the machine or component and now a second user with a second profile also wishes to access the machine or component.

It is established in Step 501 as to whether the input of the second user is in relation to a matter of a critical safety function, for example the stoppage of a machine based upon an error message.

Should this not be the case, a user switching will be made. Obviously it can in addition be arranged here that the user switching will be refused despite everything, depending on the profiles of the first and second users.

If it should be a matter if critical safety function, then it will be established in a Step 502 as to which user has a higher authorisation or ranking. These values are on file in the respective user profile. Should the second user have a lower authorisation or ranking, the change will be refused and the second user's input will be ignored.

Should the second user have a higher authorisation or ranking, he/she has to confirm, as a further stage in Step 503, that he/she wishes to make a critical safety input.

Should he/she not confirm this, no user switch will be made and the input of the second user will be ignored. Should he/she also confirm this Safety Step 503, the user switch will be made and the input of the second user accepted. The second user is now logged-in to the appropriate machine and has the sole control over the machine.

In this way it is simply ensured that in a case of critical safety, particularly when several users with mobile user units receive an error message and wish to correct this, only the input will be executed of the user with the highest ranking or authorisation for the case in question.

All of the aforementioned examples have been given for an industrial system that has the three levels of line, machine and component.

Obviously the invention can be utilized for an industrial system with fewer or more than three levels. In particular, this invention can also be utilized in other applications than bottling plants for beverages.

The invention claimed is:

1. A computer-implemented process for causing a processor to operate an industrial system, said process comprising causing an electronic computer system that comprises at least one hardware processor connected to at least one hardware memory to execute the steps of, in an industrial system that comprises a plurality of lines, each of which produces a specific end product, wherein each of said lines includes a corresponding set of machines that participate in production of said specific end product, and wherein each of said machines include components, detecting status data for each component of each machine of each line in said plurality of lines, transmitting said status data to a user unit, displaying said status data via said user unit, and providing an arrangement of the status data that is component in a manner indicative of a machine to which said component belongs, and that is also indicative of a line from said plurality of lines to which said machine belongs, whereby for each component, said arrangement of said status data indicates a machine to which said component belongs, and said status data identifies a line to which belongs said machine to which said component belongs.

2. The process of claim 1, further comprising restricting display of the status data to display of status data only for a selected structure, wherein said selected structure is selected from the group consisting of a line selected from the lines, a machine selected from the machines, and a component selected from the components.

3. The process of claim 2, wherein restricting the display of the status data comprises automatically restricting the display based at least in part on the spatial positioning of the respective user unit in relation to the selected structure.

4. The process of claim 1, wherein each user unit is assigned to a corresponding user with a specific profile, and wherein the presentation of the status data is made dependent on the profile.

5. The process of claim 1, further comprising: receiving, by each user unit, input data for a specific structure, and transmitting the input data to the specific structure, wherein said specific structure is selected from the group consisting of a specific machine, a specific component, and a specific line.

6. The process of claim 5, wherein each user unit is assigned to a corresponding user with a specific profile, and wherein the input data of only one user is transmitted to the respective specific structure.

7. The process of claim 6, further comprising restricting the type of input data based at least in part on the specific profile.

8. The process of claim 1, wherein user units are configured to communicate with one another.

9. The process of claim 2, wherein the status data includes error messages that are displayed via the user unit regardless of the display restriction.

10. The process of claim 9, wherein one user with a specific profile is assigned to each user unit, and wherein the presentation of the error messages depends at least in part on the profile.

11. An industrial system for the execution of the process of claim 1, wherein at least one of the user units is a mobile user unit, and wherein a wireless network is provided for transmitting the status data.

12. The industrial system of claim 11, wherein the at least one mobile user unit has a device for external presentation.

13. A computer system configured to execute a computer program with a program coding facility for executing the process of claim 1.

14. A tangible computer-readable medium having encoded thereon software for executing the process recited in claim 1.

15. An industrial system for execution of the process of claim 5, wherein at least one of the user units is a mobile user unit, and wherein a wireless network is provided for transmitting the input data.

16. The industrial system of claim 15, wherein the at least one mobile user unit has a device for external presentation.

* * * * *